Jan. 22, 1935. P. F. SHIVERS 1,988,877
EFFECTIVE TEMPERATURE CONTROLLER
Filed Nov. 2, 1932
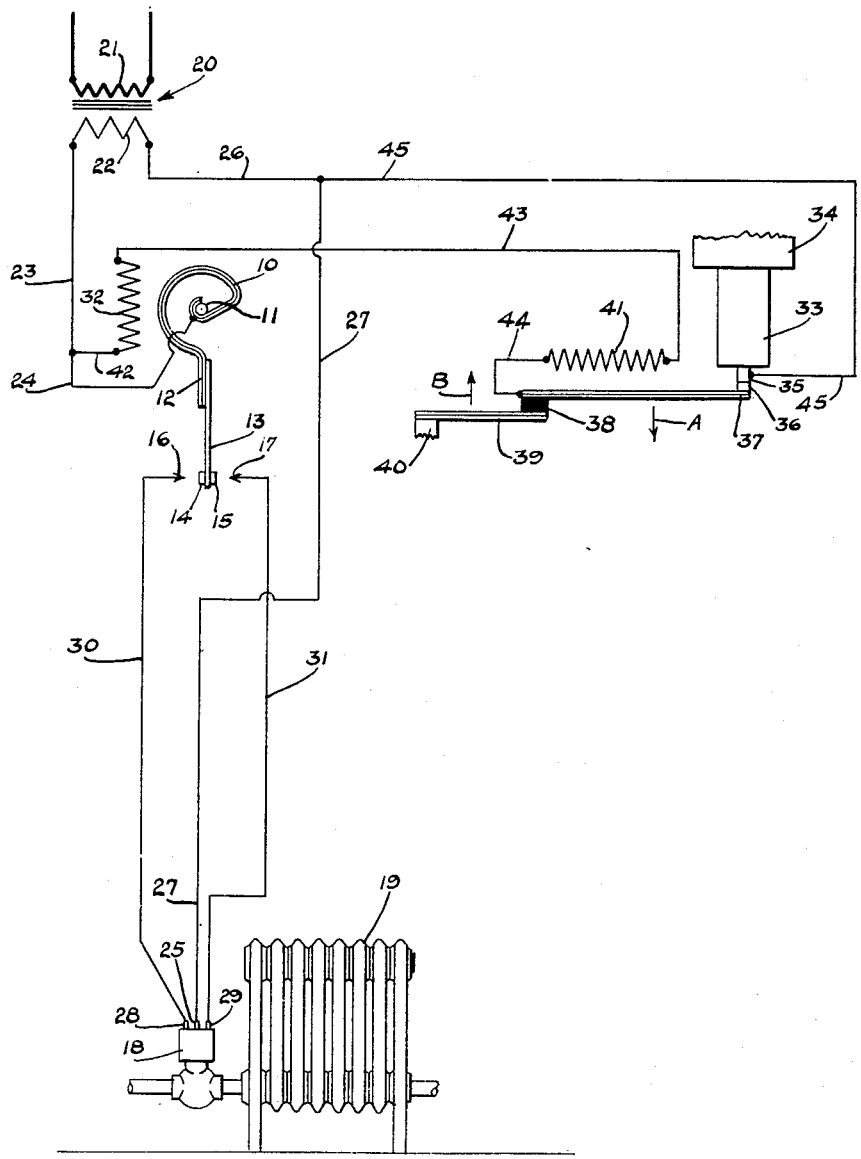
INVENTOR
PAUL F. SHIVERS
By *Paul, Paul & Moore*
ATTORNEYS Patented Jan. 22, 1935

1,988,877

UNITED STATES PATENT OFFICE 1,988,877

EFFECTIVE TEMPERATURE CONTROLLER

Paul F. Shivers, Wabash, Ind., assignor to Minneapolis-Honeywell Regulator Company, Minneapolis, Minn., a corporation of Delaware Application November 2, 1932, Serial No. 640,866

17 Claims. (Cl. 236—68)

It is now generally acknowledged in the art of air conditioning that the comfort of persons in a room or other similar inclosed space is not totally dependent on the temperature thereof but is also dependent to a great extent on the relative humidity prevailing in the room or space. Conversely it may be stated that the comfort of persons in a room or space is dependent upon a combination of temperature and relative humidity, which combination is often termed the "effective temperature".

Very often it is impractical to attempt to control the relative humidity of a room or space because of cost or other reasons. However, it is possible and entirely practical to vary the temperature maintained in the room or space in accordance with the changes in relative humidity or in other words, to maintain a constant effective temperature in the room or space while permitting fluctuations in the relative humidity and actual temperature. In this manner the room or space can be kept comfortable even though the relative humidity varies. In order to maintain a constant effective temperature, it is well known that the actual temperature is increased as the relative humidity decreases and vice versa.

The primary object of the present invention is the provision of an improved device for controlling the effective temperature of a room or space.

Various devices of this general type have been suggested in the past in which a temperature responsive element and a humidity responsive device directly co-act to give an ultimate movement representative of changes in effective temperature. One of the specific objects of the present invention is to provide an effective temperature control in which the response of a temperature responsive element is varied electrically by a relative humidity responsive device which may be placed at a relatively remote point.

Specifically, an object of the present invention is the provision of an effective temperature control in which the response of a thermostatic element is varied by applying to it a supply of auxiliary heat which is proportioned according to the relative humidity, whereby the movement of the thermostatic element is entirely due to the temperature to which it is subjected, but this temperature is made up of two components, one of which is due to space temperature and the other of which is due to space relative humidity.

Other objects of the invention will become apparent as the description thereof proceeds.

For a more complete understanding of the invention, reference may be had to the following description and accompanying single drawing which shows the details of an effective temperature controller made in accordance with the invention and one manner in which it may be applied to a heating system.

Referring to the drawing, a bimetallic thermostatic element located in the room or space to be controlled and indicated at 10 has one of its ends secured as indicated at 11. The free end 12 of the thermostatic element 10 is provided with a contact carrying arm 13 to the free end of which are secured contacts 14 and 15 respectively. Contact 14 is adapted to engage a stationary contact 16 on a rise in the temperature to which thermostatic element 10 responds and contact 15 is adapted to engage a stationary contact 17 on a fall in such temperature.

An electrically operated valve 18 is herein shown controlling the supply of steam to a radiator 19 located in the room or space to be controlled.

A source of power comprises a step down transformer 20 having a high voltage primary 21 and a low voltage secondary 22. One side of the low voltage secondary is connected to the thermostatic element 10 by wires 23 and 24. The other side of the low voltage secondary is connected to a terminal 25 of electrically operated valve 18 by wires 26 and 27. The other two terminals of the electrically operated valve designated 28 and 29 are connected to contacts 16 and 17 respectively by wires 30 and 31.

The apparatus thus far described is not new with me and is only one of the many manners in which the temperature of a room or space may be controlled. It is to be understood that any other desired type of temperature control could be utilized. The above described apparatus, without any additions or modifications, would operate to maintain a constant temperature in the space in a well-known manner, regardless of the relative humidity, by closing a circuit at 15, 17 to open valve 18 on a fall in temperature and by closing a circuit at 14, 16 to close the valve 18 when the temperature had been restored.

In order to make the thermostatic element 10 control the effective temperature of the room or space, it has been provided with a source of auxiliary heat in the form of an electrical heating coil 32 which is placed in proximity to the thermostatic element 10. The current flow to the electrical heating coil 32 is proportioned in accordance with the prevailing relative humidity, in a manner to be hereinafter described, so that the thermostatic element 10 responds to a combined temperature which is made up in part by the temperature of the space and in part by the supply of auxiliary heat supplied by the heater coil 32.

A humidity responsive device of the type that expands and contracts on changes in relative humidity is located in the room or space and is indicated at 33. One end of the humidity responsive device is secured, as by a bracket such as shown at 34, and the other end thereof carries an electrical contact 35. A cooperating contact 36 is secured to one end of a bimetallic strip 37 which moves in the direction of the arrow A on heating. The other end of strip 37 is secured to a block of heat insulating material 38 which in turn is carried by the free end of a compensating bimetallic strip 39 the other end of which is secured as shown at 40. Compensating bimetallic strip 39 moves in the direction of arrow B on heating. These bimetallic strips 37 and 39 are therefore arranged in such a manner that contact 36 remains stationary upon changes in the room or space temperature. The contacts 35 and 36 are normally in engagement. A second electrical heating coil 41 is arranged to heat bimetallic strip 37 but not compensating strip 39. One end of electrical heating coil 32 is connected to low voltage secondary 22 by wires 23 and 42 and the other end thereof is connected to one end of electrical heating coil 41 by wire 43. The other end of electrical heating coil 41 is connected to bimetallic strip 37, and therefore contact 36, by a wire 44, and wires 45 and 26 connect contact 35 with the other side of low voltage secondary 22.

*Operation*

Assuming a low relative humidity in the room or space to be controlled and that contacts 35 and 36 are closed, it will be seen that the following circuit is established: low voltage secondary 22, wire 23, wire 42, electrical heating coil 32, wire 43, electrical heating coil 41, wire 44, bimetallic strip 37, contact 36, contact 35, wire 45, and wire 26 to secondary 22. The heat generated by electrical heating coil 41 will cause thermostatic strip 37 to move in the direction of arrow A and separate contact 36 from contact 35. This separation of contacts 35 and 36 will break the above described circuit deenergizing heating coils 32 and 41. Thermostatic strip 37 will now begin to cool and as a result contacts 35 and 36 will again close reestablishing the above mentioned circuit through heater coils 32 and 41. This make and break at contacts 35 and 36 will repeat with a rapidity depending upon how far thermostatic strip 37 must move in order to separate the contacts 35 and 36 and also upon the voltage impressed on this circuit by the secondary 22. The amount of heat given off by the heater coil 41 will vary directly with the rapidity of the make and break between contacts 35 and 36. The amount of movement necessary by thermostatic element 37 to separate contacts 35 and 36 will depend upon the position of contact 35 which is in turn controlled by the humidity responsive device 33 which is subjected to the relative humidity prevailing in the space. The heater coil 32 being in series circuit relation with heater coil 41 and contacts 35 and 36 will therefore give off an amount of heat which is proportional to the relative humidity of the space. It is to be understood that the make and break of the contacts 35 and 36 is relatively rapid so that for any given position of contact 35 (the result of a given relative humidity in the space) a certain definite average amount of heat will be given off by heater coil 32. With a low relative humidity, as assumed above, not much heat will be required from heater coil 41 to separate contacts 35 and 36 so that heater coil 32 will give off a relatively small average heat. As the relative humidity of the space rises, the contact 35 will move toward contact 36 so that a greater amount of heat will be necessary from heater coil 41 to separate contacts 35 and 36 with the result that heater coil 32 will give off a proportionately larger average amount of heat.

From the foregoing description it will be apparent that the heater coil 32 supplies a variable amount of heat to thermostatic element 10. This variable supply of heat is proportionate to the relative humidity prevailing in the room or space. Thermostatic element 10 will move contacts 14 and 15 into engagement with contacts 16 and 17 at definite temperature conditions of the thermostatic element 10. When the relative humidity is low the temperature condition of thermostatic element 10 necessary to operate the contacts will only be obtained when the room temperature is substantially at that point necessary to operate those contacts and the additional heat required will be furnished by heater coil 32. It follows then, that as more heat is supplied by heater coil 32 because of an increase in relative humidity the contacts controlled by the thermostatic element 10 will be operated at a lower room temperature. The valve 18 will therefore be controlled to maintain a room temperature which is not constant but which is varied according to changes in relative humidity. This arrangement will, however, maintain what is known as effective temperature at a constant value.

It will be evident, from the foregoing description, that while a certain temperature condition is necessary at the thermostatic element 10 to operate the contacts controlled thereby, that this temperature condition is a composite temperature part of which is due to the temperature of the room or space and the other part of which is due to the relative humidity prevailing in the space. The contacts 14, 15, 16, and 17, therefore are operated by the combined effect of the space temperature and relative humidity and control the heating means in such a manner as to maintain a constant effective temperature.

It will be obvious that the same result could be obtained by having the electrical heating element 32 operate suitable thermostatic mechanism, properly compensated for ambient temperatures, to shift one or more of the contacts 16, 17 in order to vary the actual temperature at which the valve 18 would be opened and closed.

While a specific embodiment of the invention has been described it will be obvious that many modifications could readily be made thereto and I intend to be limited only in the purview of the appended claims.

I claim as my invention:

1. A device of the class described, comprising, in combination, a thermostatic element responsive to the temperature of a space the effective temperature of which is to be controlled, a humidity responsive device located in said space, electrical heater means for varying the response of said thermostatic element to the temperature of the space, and means operated by the humidity responsive device for controlling said electrical means in accordance with the relative humidity of the space.

2. A device of the class described, comprising, in combination, a thermostatic element located in a space the effective temperature of which is to be controlled, a humidity responsive device located in said space, auxiliary means for heating the thermostatic element whereby the same responds to the combined heating effect of the space temperature and auxiliary heating means, and means under the control of the humidity responsive device for varying the amount of heat delivered to the thermostatic element by the auxiliary heating means in accordance with the relative humidity of the space.

3. A device of the class described, comprising, in combination, a thermostatic element located in a space the effective temperature of which is to be controlled, a humidity responsive device located in said space, an electrical heating element for supplying an auxiliary source of heat to the thermostatic element whereby the same responds to the combined effect of the space temperture and auxiliary source of heat, and means controlled by the humidity responsive device for varying the amount of heat supplied by the electrical heating element to the thermostatic element in accordance with the relative humidity prevailing in the space.

4. A device of the class described, comprising, in combination, a thermostatic element located in a space the effective temperature of which is to be controlled, a humidity responsive device located in said space, an electrical heating element for supplying an auxiliary source of heat to the thermostatic element whereby the same responds to the combined effect of the space temperture and auxiliary source of heat, and means controlled by the humidity responsive device for varying the current flow thru said electrical heating element per unit of time in accordance with the relative humidity prevailing in the space.

5. A device of the class described, comprising, in combination, a thermostatic element located in a space the effective temperature of which is to be controlled, a humidity responsive device located in said space, an electrical heating coil placed in proximity to the thermostatic element, and means controlled by the humidity responsive device for varying the current flow to said heating coil per unit of time in proportion to the relative humidity prevailing in the space, whereby said thermostatic element responds to the combined action of the space temperature and the electrical heating coil.

6. A device of the class described, comprising, in combination, a thermostatic element located in a space the effective temperature of which is to be controlled, an electrical heating element associated with the thermostatic element for furnishing an auxiliary supply of heat to the thermostatic element whereby the same will respond to the combined heating effect of the space temperature and the auxiliary supply of heat, a humidity responsive device located in the space, a contact variably positioned thereby according to the relative humidity prevailing in the space, a cooperating contact, a thermostatic element in control of the cooperating contact, an electrical heating element for heating said last named thermostatic element, and a circuit including the heating elements and contacts in series, said last named thermostatic element operating to separate the contacts when heated, whereby the current flow thru said series circuit per unit of time will be varied according to the position of the first named contact.

7. A device of the class described, comprising, in combination, a thermostatic element located in a space the effective temperature of which is to be controlled, an electrical heating element associated with the thermostatic element for furnishing an auxiliary supply of heat to the thermostatic element whereby the same will respond to the combined heating effect of the space temperature and the auxiliary supply of heat, a humidity responsive device located in the space, a contact variably positioned thereby according to the relative humidity prevailing in the space, a cooperating contact, a thermostatic element in control of the cooperating contact, a compensating thermostatic element associated with the last named thermostatic element and the cooperating contact for maintaining the cooperating contact in the same position upon changes in the ambient temperature to which said cooperating and last named thermostatic elements are subjected, an electrical heating element for heating the last named thermostatic element only and a circuit including both heating elements and both contacts in series, said last named thermostatic element operating to separate said contacts upon heating by its heating element.

8. An effective temperature controller, comprising, in combination, a thermostatic element responsive to the temperature of a space the effective temperature of which is to be controlled, electrically operated means for varying the response of said thermostatic element to the temperature of the space, a humidity responsive device located in the space, a contact controlled thereby, a cooperating contact, thermostatic means in control of said cooperating contact, said thermostatic means being adapted to move the cooperating contact from engagement with the first named contact when heated, an electrical heating element for heating the thermostatic means, and a circuit including said electrically operated means, electrical heating element and both contacts in series.

9. An effective temperature controller, comprising, in combination, a thermostatic element responsive to the temperature of a space the effective temperature of which is to be controlled, electrically operated means for varying the response of said thermostatic element to the temperature of the space, a humidity responsive device located in the space, a contact controlled thereby, a cooperating contact, thermostatic means in control of said cooperating contact, said thermostatic means being adapted to move the cooperating contact from engagement with the first named contact when heated, an electrical heating element for heating the thermostatic means, and electrical connections between the electrically operated means, electrical heating element and both contacts whereby the contacts control the current flow through the electrically operated means and electric heating element.

10. An effective temperature controller, comprising, in combination, a thermostatic element located in a space the effective temperature of which is to be controlled, a humidity responsive device located in said space, a contact carried by the humidity responsive device and moved thereby conformably to variations in relative humidity in the space, thermostatic means, a contact carried thereby and engageable with the first named contact when said thermostatic means is relatively cold, an electric heating element for the thermostatic means, an electric heating element for the thermostatic element, and a circuit including both the electric heating elements and both the contacts in series.

11. In combination, a temperature responsive control mechanism located in a space the temperature of which is to be controlled and operative to control said temperature, a humidity responsive device in said space, and electrical heater means under the control of the humidity responsive device for varying the action of said mechanism to maintain higher space temperatures as the relative humidity decreases and to maintain lower space temperatures as the relative humidity increases.

12. In combination, a temperature responsive control mechanism located in a space the temperature of which is to be controlled and operative to control said temperature, a humidity responsive device in said space, and auxiliary heating means under the control of the humidity responsive device for varying the action of said mechanism to maintain varying space temperatures.

13. In combination, a temperature responsive control mechanism located in a space the temperature of which is to be controlled and operative to control said temperature, a humidity responsive device in said space, and auxiliary heating means under the control of the humidity responsive device for varying the action of said mechanism to maintain higher space temperatures as the relative humidity decreases and lower space temperatures as the relative humidity increases.

14. In combination, a temperature responsive control mechanism located in a space the temperature of which is to be controlled and operative to control said temperature, a humidity responsive device in said space, an electric heating element for varying the action of said mechanism, and means controlled by the relative humidity device for varying the amount of heat delivered by the electric heating element in proportion to changes in the relative humidity.

15. An effective temperature control system of the class described comprising in combination, an electrically controlled temperature changing means for an enclosed space, a thermostat responsive to space temperature changes in control of said means, an electrical element associated with the thermostat and arranged upon energization to cause the thermostat to maintain a different temperature in the space than when deenergized, and a humidostat responsive to changes in relative humidity in the space for energizing and deenergizing said electrical element.

16. An effective temperature control system of the class described comprising in combination, an electrically controlled temperature changing means for an enclosed space, a thermostat responsive to space temperature changes in control of said means, an electrical element associated with the thermostat and arranged to cause the thermostat to maintain a different temperature in the space upon a change in the amount of current flowing through said element, a humidostat responsive to changes in relative humidity in the space for varying the amount of current flowing through said element.

17. An effective temperature control system of the class described comprising in combination, electrically controlled heat supply means for an enclosed space, an electric circuit therefor, a movable contact to change the current flow in the circuit, temperature responsive means located in the space to move the contact, relative humidity responsive means located in the space, an electric circuit controlled thereby, said circuits being interconnected to change the current flow in the first-mentioned circuit whereby the heat supply means is varied in accordance with the effective temperature of the space.

PAUL F. SHIVERS.